US006904186B2

United States Patent
Kondo et al.

(10) Patent No.: US 6,904,186 B2
(45) Date of Patent: Jun. 7, 2005

(54) OPTICAL MODULATORS AND A METHOD FOR MODULATING LIGHT

(75) Inventors: Atsuo Kondo, Okazaki (JP); Osamu Mitomi, Nagoya (JP); Jungo Kondo, Nishikamo-gun (JP); Kenji Aoki, Ogaki (JP)

(73) Assignee: NGK Insulators, Ltd., Nagoya (JP)

( * ) Notice: Subject to any disclaimer, the term of this patent is extended or adjusted under 35 U.S.C. 154(b) by 108 days.

(21) Appl. No.: 10/291,678

(22) Filed: Nov. 12, 2002

(65) Prior Publication Data

US 2003/0138180 A1 Jul. 24, 2003

(30) Foreign Application Priority Data

Nov. 16, 2001 (JP) ..................................... P2001-351142

(51) Int. Cl.[7] .............................................. G02F 1/035
(52) U.S. Cl. ......................................................... 385/2
(58) Field of Search .............................. 385/1–4, 8, 9, 385/14, 129–132

(56) References Cited

U.S. PATENT DOCUMENTS

| 5,488,503 A | * | 1/1996 | Schaffner et al. ........... 359/245 |
| 5,515,195 A | * | 5/1996 | McAdams ..................... 385/42 |
| 5,627,929 A | | 5/1997 | Vawter et al. ................. 385/45 |
| 5,764,400 A | * | 6/1998 | Itou et al. ..................... 359/245 |
| 5,953,466 A | * | 9/1999 | Kubota et al. ................. 385/2 |
| 6,668,103 B2 | * | 12/2003 | Hosoi ............................. 385/2 |

FOREIGN PATENT DOCUMENTS

| EP | 0 859 263 A2 | 8/1998 |
| JP | A 3-145623 | 6/1991 |
| JP | A-4-24610 | 1/1992 |
| JP | A-2001-215455 | 8/2001 |

* cited by examiner

Primary Examiner—Edward J. Glick
Assistant Examiner—Thomas R Artman
(74) Attorney, Agent, or Firm—Oliff & Berridge, PLC

(57) ABSTRACT

An optical modulator modulates light propagating in a three-dimensional optical waveguide 5 by applying a voltage on the waveguide. The modulator has a three dimensional optical waveguide 5 having at least a pair of branched portions 5b, 5c and a recombining portion 5f of the branched portions 5c, 5d and radiating light of off-mode, and a slab optical waveguide 4 guiding the light of off-mode. The modulator also has modulating electrodes 7A, 7B, 7C for applying a signal voltage and a direct current bias on the waveguide 5 to modulate light propagating in the waveguide 5. The modulator further has a photo detector 13 for detecting light radiated from the slab optical waveguide 4, and a controlling unit 15 for varying the direct current bias based on an output from the photo detector 13 so as to control the operational point of the modulator. According to the modulator, the operational point may be controlled with improved efficiency and stability.

13 Claims, 11 Drawing Sheets

OPTICAL MODULATORS AND A METHOD FOR MODULATING LIGHT

This application claims the benefit of Japanese Patent Application P2001-351142 filed on Nov. 16, 2001, the entirety of which is incorporated by reference.

BACKGROUND OF THE INVENTION

1. Field of the Invention

The present invention relates to an optical modulator.

2. Related Art Statement

It has been noted a travelling-wave type high speed optical modulator using so-called Mach-Zehnder type optical waveguide. According to this type of optical modulator, light is propagated in a pair of branched waveguide portions, respectively, so that the outputs from the branched waveguides are recombined at a recombining portion. The shift of the operational point or DC drift may occur due to a cause such as a temperature difference between the branched waveguide portions Several methods have been proposed to control the shift of the operational point or DC drift. Representatively, Japanese patent publication P3-145, 623A discloses a method for utilizing light of substrate radiation-mode radiated from the recombining portion of the branched waveguide portions into a substrate. That is, light of on-mode is propagated in an optical waveguide and then radiated from the end face of the waveguide. Light of off-mode is radiated from the optical waveguide into a substrate as light of so-called substrate radiation-mode. An optical fiber is fitted onto the end face of the substrate to receive the light of substrate radiation-mode. The optical fiber then emits light to be detected by a photo detector. The photo detector then outputs an output signal, which is utilized for changing a magnitude of a direct current bias applied by a modulating electrode on the optical waveguide and thus controlling the operational point of the optical modulator.

SUMMARY OF THE INVENTION

The light of off-mode is, however, propagated in the substrate, reflected at the interface between the substrate and air and thus scattered. It is difficult to receive the light propagating in the substrate while being scattered at a high efficiency by means of an optical fiber fitted on the end face of the substrate. The light intensity of the received light of off-mode is thus low and unstable for realizing efficient and stable control of the operational point.

An object of the present invention is to provide a novel optical modulator for modulating light propagating in an optical waveguide by applying a voltage so that the operational point may be efficiently controlled.

The present invention provides an optical modulator for modulating light propagating in a three-dimensional optical waveguide by applying a voltage on the waveguide. The modulator has a three-dimensional optical waveguide having at least a pair of branched portions and a recombining portion of the branched portions and radiating light of off-mode, and a slab optical waveguide guiding the light of off-mode. The modulator further has a modulating electrode for applying a signal voltage and a direct current bias on the three-dimensional optical waveguide to modulate light propagating in the three-dimensional optical waveguide, a photo detector for detecting light radiated from the slab optical waveguide, and a controlling unit for varying the direct current bias based on an output from the photo detector so as to control the operational point of the modulator.

The present invention further provides a method for modulating light propagating in a three-dimensional optical waveguide by applying a voltage on the waveguide. The method has the steps of:

preparing an optical modulator comprising a three-dimensional optical waveguide including at least a pair of branched portions and a recombining portion of the branched portions, and a modulating electrode for applying a signal voltage and a direct current bias on light propagating in the three-dimensional optical waveguide;

propagating light of off-mode radiated from the recombining portion in slab mode;

receiving the light of off-mode; and varying the direct current bias based on the received light so as to control the operational point of the modulator.

According to the present invention, light of off-mode radiated from the recombining portion is propagated in slab mode and is then received. The direct current bias is then controlled based on the received light of off-mode. In slab propagation-mode, light is propagated in two-dimensionally condensed state at a high density. Such light can be efficiently received and detected, eliminating the difficulty of the detection of light of substrate radiation-mode due to scattering. Light of off-mode in an optical modulator is propagated in slab mode, which is then received and utilized for feedback control system for the operational point, according to the present invention. It is thereby possible to control the operational point with improved efficiency and stability.

These and other objects, features and advantages of the invention will be appreciated upon reading the following description of the invention when taken in conjunction with the attached drawings, with the understanding that some modifications, variations and changes of the same could be made by the skilled person in the art.

PREFERRED EMBODIMENTS OF THE INVENTION

Figure 1:
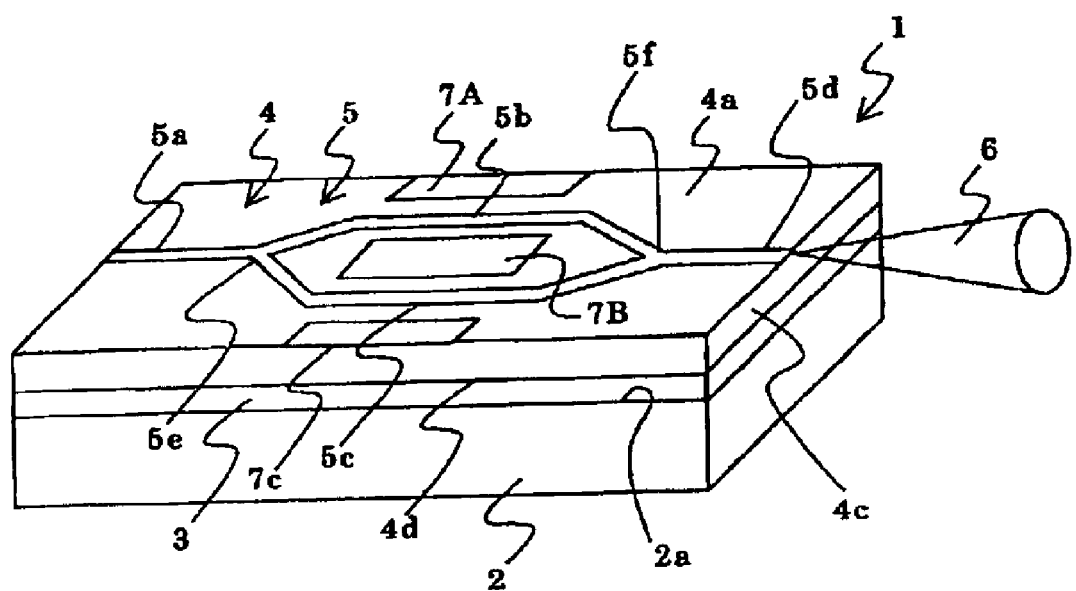
FIG. 1 is a perspective view schematically showing an optical modulating device 1 radiating a signal light 6.
Figure 2:
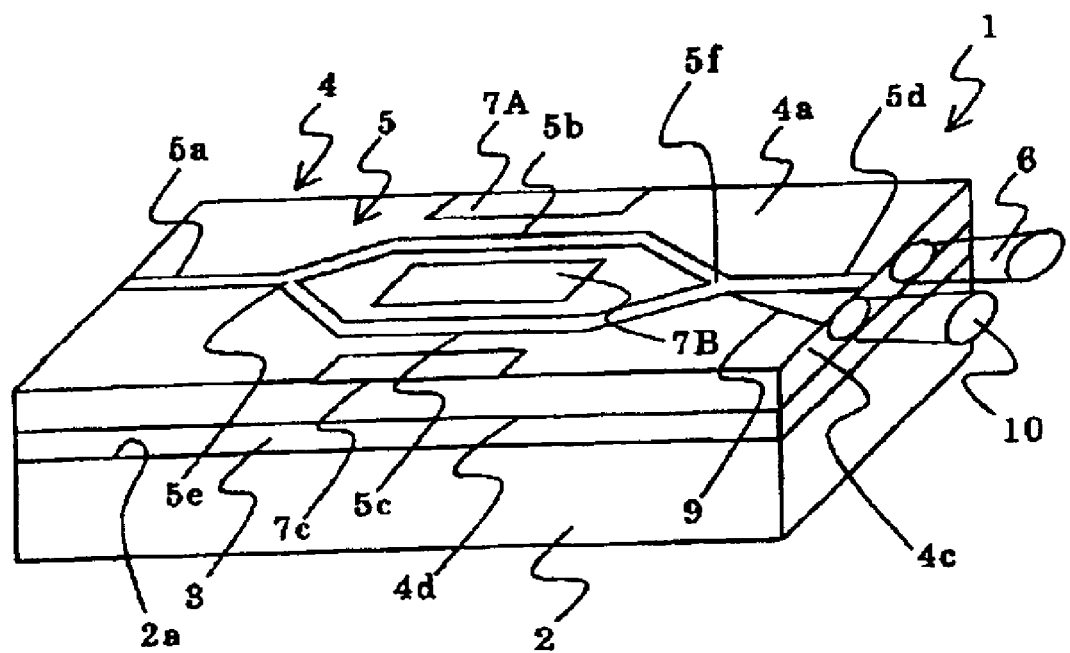
FIG. 2 is a perspective view schematically showing an optical modulating device 1 radiating a reference light 10 of off-mode.
Figure 3:
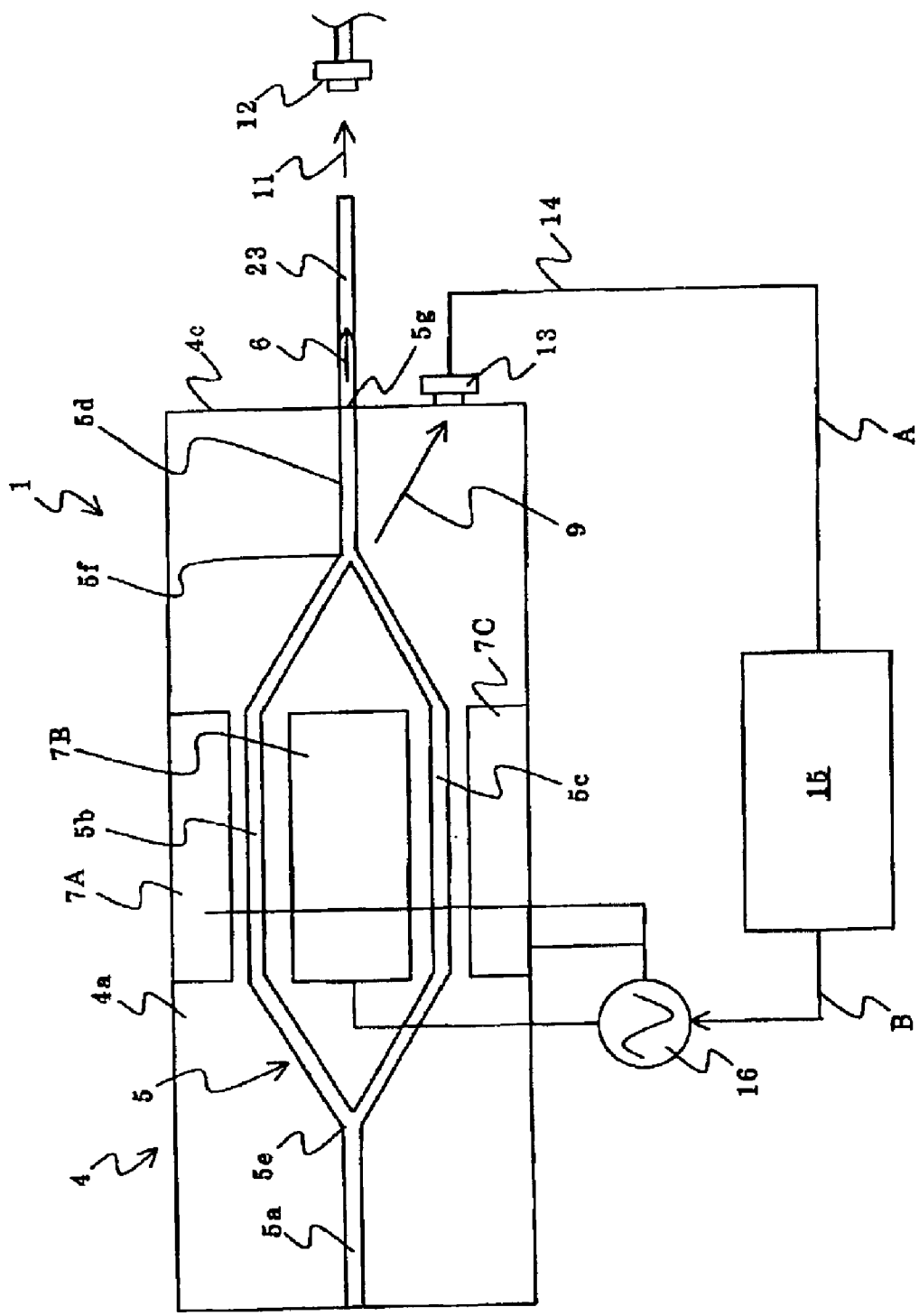
FIG. 3 is a block diagram schematically showing an optical modulator having an optical modulating device 1, a photo detector 13, a controlling unit 15 and a source controlling unit 16.

The present invention will be further described, referring to FIGS. 1 to 3. An optical modulating device 1 according to the present embodiment has a supporting substrate 2, a slab type optical waveguide 4 and an adhesive layer 3 joining a surface 2a of the substrate 2 and a bottom 4d of the waveguide 4. The slab optical waveguide 4 is composed of a flat plate made of a material having a refractive index higher than that of the adhesive layer 3. A three-dimensional optical waveguide 5 of Mach-Zehnder type and modulating electrodes 7A, 7B and 7C are formed on the side of the surface 4a of the flat plate 4. The waveguide 5 has an input portion 5a, a pair of branched portions 5b, 5c and an output portion 5d. 5e represents a splitting point and 5f a recombining portion. A method for modulating light propagating in the waveguide 5 and detailed construction of the electrodes are known and their explanation will be omitted As shown in FIGS. 1 and 3, a signal light 6 is emitted from an end face 5g of the output portion 5d of the three-dimensional optical waveguide 5 in on-mode. The emitted light 6 is then transmitted through an optical fiber 23 and then irradiated from the fiber 23 as an arrow 11, which is detected by means of a photo detector 12.

Light is not emitted from the three-dimensional optical waveguide in off-mode. Instead of this, as shown in FIG. 2, light is radiated from the recombining portion 5f or near and propagated in the flat plate 4 as an arrow 9. The flat plate 4 may function as a slab optical waveguide so that light 9 is propagated in slab mode therein, by appropriately adjusting the thickness of the flat plate 4. The light is then emitted from the end face 4c of the slab waveguide 4 as a numeral 10.

A photo detector 13 is fitted onto the end face 4c of the slab optical waveguide 4 for receiving the light 9 propagating through the waveguide 4. The received light is converted into an electric signal in the photo detector 13. The electric signal is then transmitted to a controlling unit 15 through a cable 14 as an arrow "A". In the controlling unit 15, information of the light 9 of off-mode is drawn from the electric signal and utilized to calculate an appropriated value of a direct current bias. A controlling signal carrying the calculated value of the bias is then transmitted to a source controlling unit 16 as an arrow "B". The unit 16 may adjust or change the value of the direct current bias as needed.

A slab type or two-dimensional optical waveguide may be defined as follows. This is a waveguide having a function of confining light in a specified direction when the waveguide is observed in a cross section perpendicular to a direction of light propagation. For example, light is confined horizontally in the modulator shown in FIG. 5. The waveguide also should function to propagate one or more propagating mode of light. Light of slab propagation-mode means light propagating in the slab type or two-dimensional optical waveguide while confined in a specified direction. For example, the light of slab mode is propagated while confined horizontally in the modulator shown in FIG. 5. The light of slab propagation mode is usually propagated in multi mode, that is, propagated in a plurality of propagation-modes.

The thickness of a slab optical waveguide is not particularly limited. The thickness may be designed so that a maximum efficiency is obtained, based on the wavelength of light used, the kind of photo detector, the direction of fitted photo detector, and the condensing efficiency of light propagating in the slab optical waveguide. For example, when a slab optical waveguide is made of lithium niobate, an adhesive layer with a low dielectric constant is applied as an underclad layer and a communication wavelength band of 1.55 $\mu$m is applied, the thickness of a slab optical waveguide may preferably be not larger than 20 $\mu$m. When a slab optical waveguide is too thin, however, light of off-mode is leaked into the adhesive layer by cut-off and prevented from the confinement and detection. The thickness of a slab optical waveguide may preferably be not smaller than 3 $\mu$m on this viewpoint.

In a preferred embodiment, as shown in FIG. 3, a photo detector is fitted onto the end face of a slab optical waveguide. It is thereby possible to eliminate the necessity of providing a photo detector separately outside of the substrate constituting the modulator. It is also possible to eliminate the necessity of an outer optical transmitter for transmitting light of off-mode emitted from the modulating device to the photo detector.

For example, in a modulator shown in FIGS. 1 to 3, when lithium niobate in used as a material for the slab optical waveguide 4 and supporting substrate, a standardized sensitivity provided by a common photo detector is stable and sufficiently larger than 0.4 A/W. On the contrary, when light of substrate radiation-mode is detected by a common photo detector, as in a prior art, the standardized sensitivity provided by such photo detector is proved to be about 0.4 A/W at maximum as well as unstable.

In another preferred embodiment, an optical transmitter is provided for receiving the light of off-mode and light emitted from the transmitter is then received by a photo detector. Although such optical transmitter may preferably be an optical fiber, it may also be a ferrule or the like. Such photo detector may preferably be fitted onto a surface of a wall constituting a package for an optical modulator.

Although the intensity of light may preferably be measured, the phase or wavelength of light may also be measured in a photo detector. The kind of a photo detector is not particularly limited. For example, when light is to be modulated using an electric signal of 10 Gb/s, it may be used a photo detector applying InGaAs system capable of a high speed response and a sufficiently large band width for the detection.

The shape or pattern of the recombining portion is not particularly limited. The respective branched portions of the three-dimensional optical waveguide may be crossed or intersected at the recombining portion, or may be spaced apart from each other without crossing at the recombining portion. It is, however, needed that the light energy propagating in the respective branched portions may be recombined at or around the recombining portion.

Further, at lease one pair of the branched portions are necessary for the present invention. Two or more pairs of the branched portions may be provided. The three-dimensional optical waveguide may have so-called cascade-type branched structure.

Figure 4:
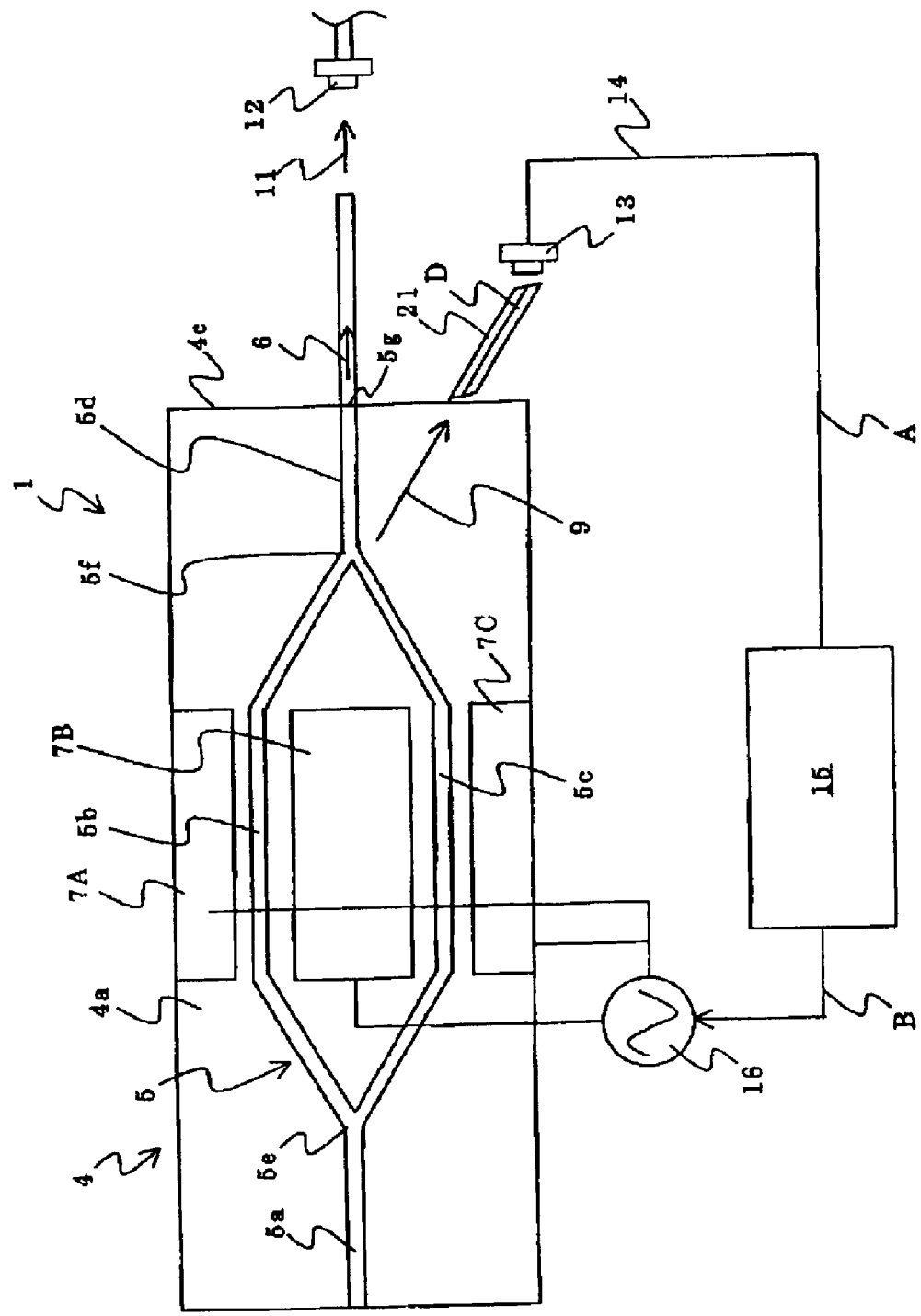
FIG. 4 is a block diagram schematically showing another optical modulator.

FIG. 4 schematically shows an optical modulator according to this embodiment. The optical modulating device 1 of the modulator is substantially same as that shown in FIG. 1. In FIG. 4, a photo detector 13 is fixed at a position distant from the end face 4c of the slab waveguide 4 of the device 1. An optical transmitter 21 is provided in a position opposing the end face 4c. The light 9 of slab propagation-mode is irradiated from the end face 4c, propagated as an arrow "D" in the transmitter 21 and then irradiated into the photo detector 13.

The relative position of the three-dimensional and slab optical waveguides is not particularly limited. It is sufficient for the present invention that light of on-mode is propagated in the three-dimensional optical waveguide and light of off-mode is propagated in the slab optical waveguide.

In a preferred embodiment, the three-dimensional and slab optical waveguides are contacted with each other or continuously formed. It is thereby possible to reduce the propagation loss of optical energy between the recombining portion of the three-dimensional waveguide and slab optical waveguide.

In a preferred embodiment, the three-dimensional optical waveguide is formed by processing a material constituting the slab optical waveguide. Such method of processing includes proton exchange, titanium inner diffusion and metal ion diffusion. By such processing, the refractive index of a material for the three-dimensional optical waveguide (without the processing) may be made larger than that of a material for the slab optical waveguide (formed by the processing). Further, the surface of the slab optical waveguide may be removed by mechanical, laser or ablation working to form a three-dimensional optical waveguide of so-called ridge type.

In a preferred embodiment, the three-dimensional optical waveguide is a ridge type waveguide protruding from the underlying slab optical waveguide. Such three-dimensional optical waveguide may be formed as described above. Alternatively, a film having a higher refractive index may be formed on the slab waveguide and then processed by mechanical or laser ablation working to form a three-dimensional optical waveguide of ridge type. The film with a higher refractive index may be formed by any process including chemical vapor deposition, physical vapor deposition, organic metal chemical vapor deposition, sputtering and liquid phase epitaxial process.

A material constituting the slab optical waveguide may be any material transmitting light, including a ferroelectric single crystal, glass or optical resin. A ferroelectric single crystal is preferred. Such crystal includes lithium niobate, lithium tantalate, a lithium niobate-lithium tantalate solid solution, potassium lithium niobate, potassium lithium tantalate, a potassium lithium niobate-potassium lithium tantalate solid solution and KTP.

In a preferred embodiment, the optical modulator has a supporting substrate, and an adhesive layer for joining the substrate with the slab optical waveguide and having a refractive index lower than that of the slab waveguide. A material for the supporting substrate may preferably be a ferroelectric single crystal as listed above, glass and resin. The adhesive agent may preferably be a glass or resin.

The above described glass may preferably have a low dielectric constant and a temperature range suited for the adhesion process (working temperature) of not higher than about 600° C. Furthermore, the glass may preferably provide a strength sufficient for the subsequent processing. For example, the glass may preferably be a so-called solder glass having a composition of oxides selected from the group consisting of silicon oxide, lead oxide, aluminum oxide, magnesium oxide, calcium oxide, boron oxide or the like.

The above described resin may preferably be a room-temperature curable resin, heat curable resin and ultraviolet radiation curable resin, and a resin with a low dielectric constant. For example, epoxy, acrylic and urethane resins are particularly preferred.

FIGS. 5 to 10 are front views showing optical modulating devices, respectively, observed from the end faces. Each device has a supporting substrate and a slab optical waveguide joined with the substrate.

Figure 5:
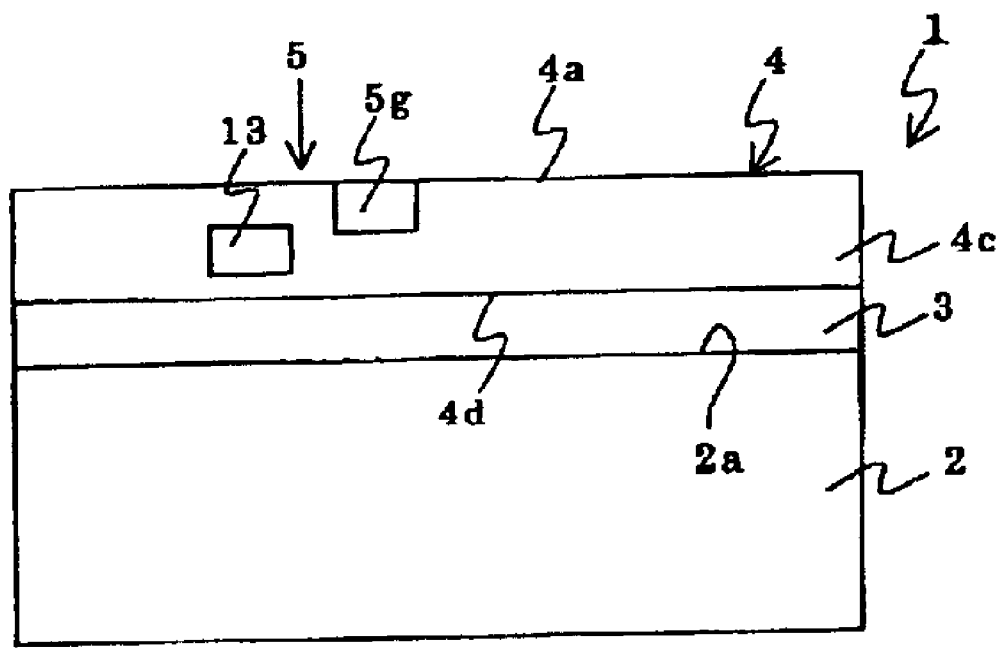
FIG. 5 is a front view showing an optical modulating device 1 at its end face.

In a device 1 shown in FIG. 5, a region 5 having a higher refractive index is formed from the upper face 4a of the slab optical waveguide 4 toward the inside of the waveguide 4. The region 5 constitutes a three-dimensional optical waveguide.

Figure 6:
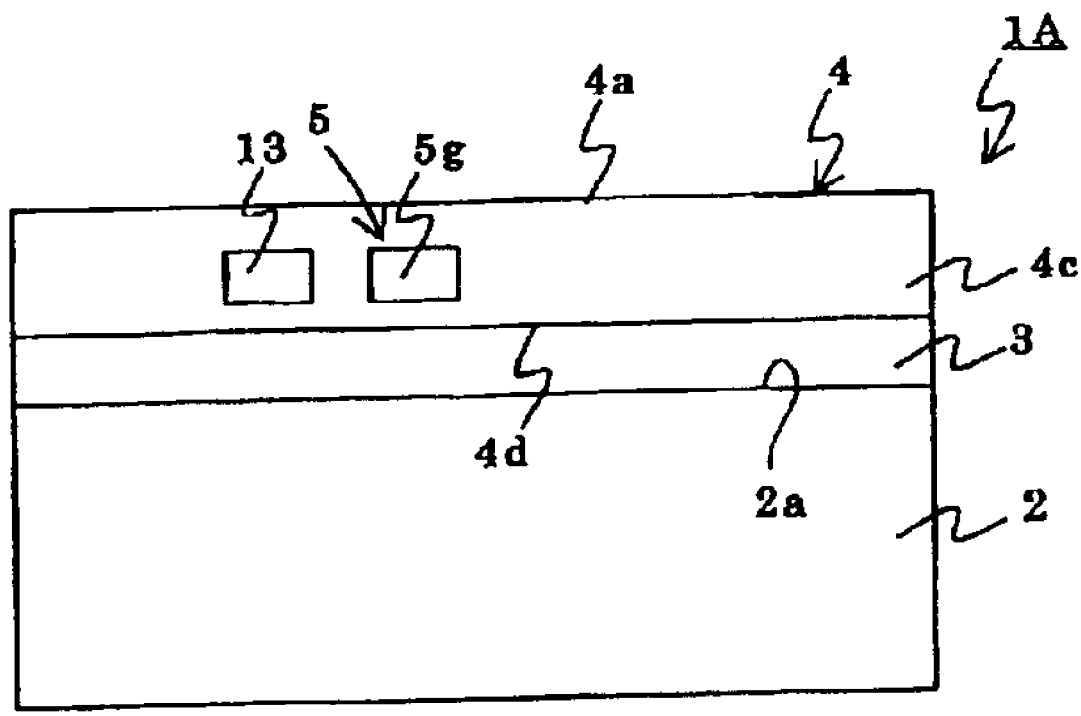
FIG. 6 is a front view showing an optical modulating device 1A at its end face.

In a device 1A shown in FIG. 6, a region 5 having a higher refractive index is formed in the central portion of the slab optical waveguide 4 viewed in the direction of thickness. The region 5 constitutes a three-dimensional optical waveguide.

Figure 7:
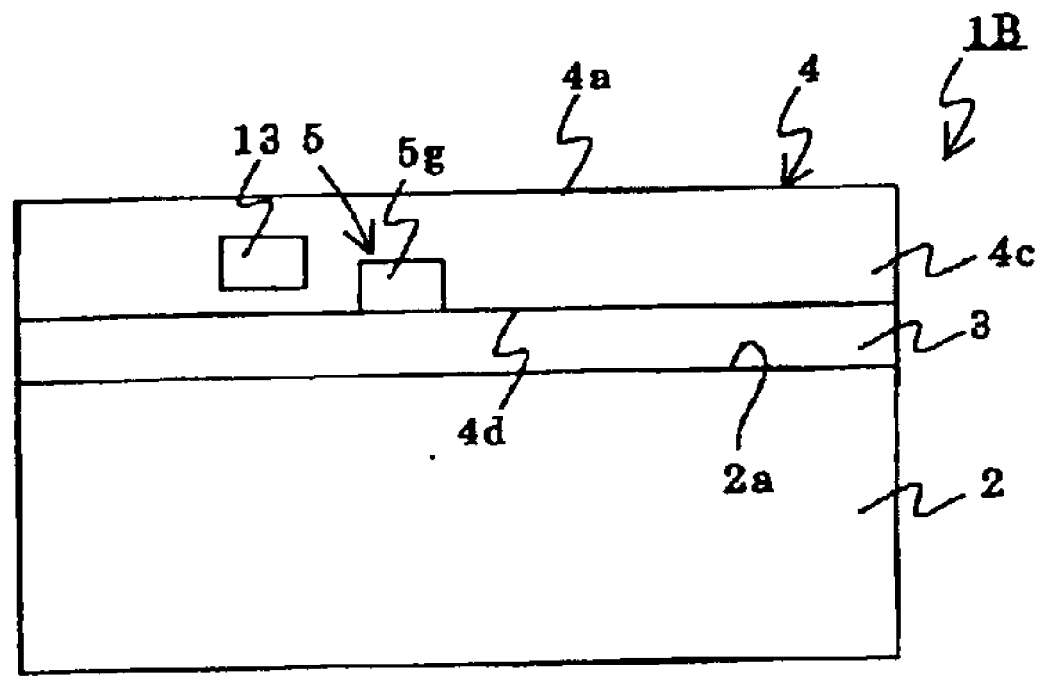
FIG. 7 is a front view showing an optical modulating device 1B at its end face.

In a device 1B shown in FIG. 7, a region 5 having a higher refractive index is formed from the bottom face 4d of the slab waveguide 4 toward the inside of the waveguide 4. The region 5 constitutes a three-dimensional optical waveguide. In a cross section shown in FIG. 7, the three faces of the three-dimensional optical waveguide 5 is continuous with the slab waveguide 4 and one face (lower face) of the waveguide 5 is contacted with an adhesive agent 3. The three-dimensional optical waveguide 5 is thus surrounded by the slab waveguide 4 and adhesive agent layer 3.

Figure 8:
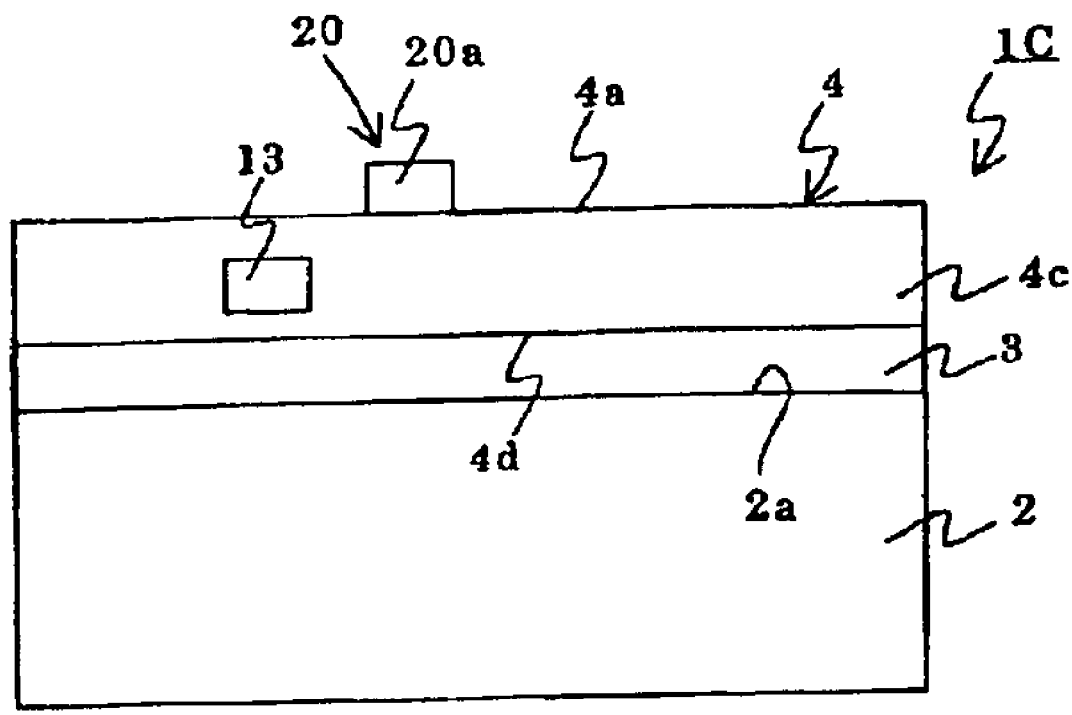
FIG. 8 is a front view showing an optical modulating device 1C at its end face.
Figure 9:
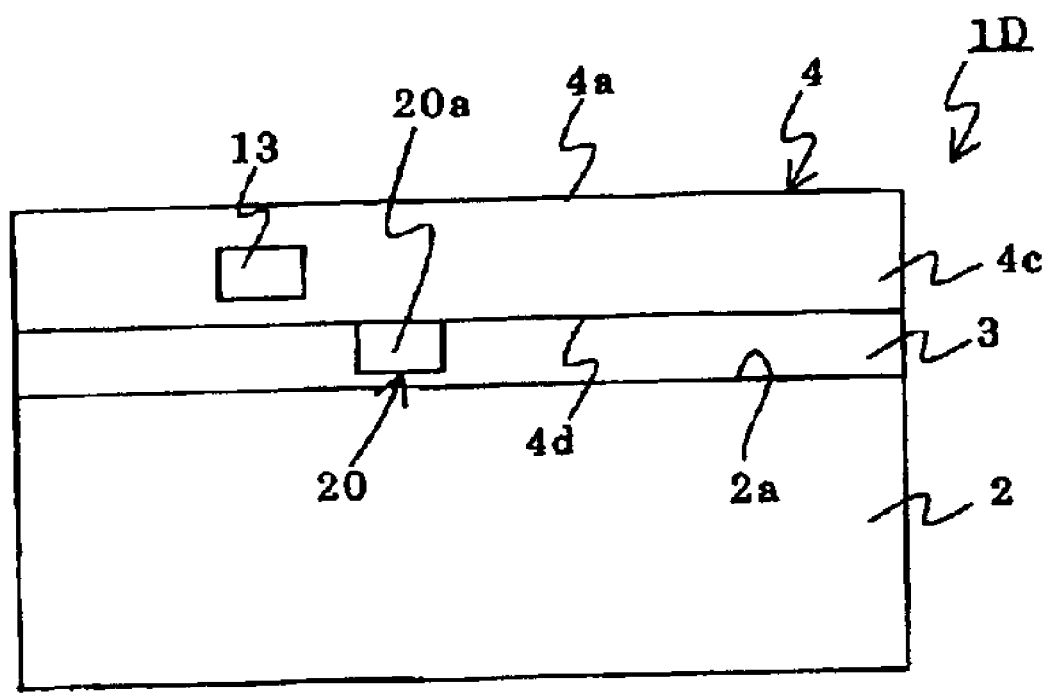
FIG. 9 is a front view showing an optical modulating device 1D at its end face.
Figure 10:
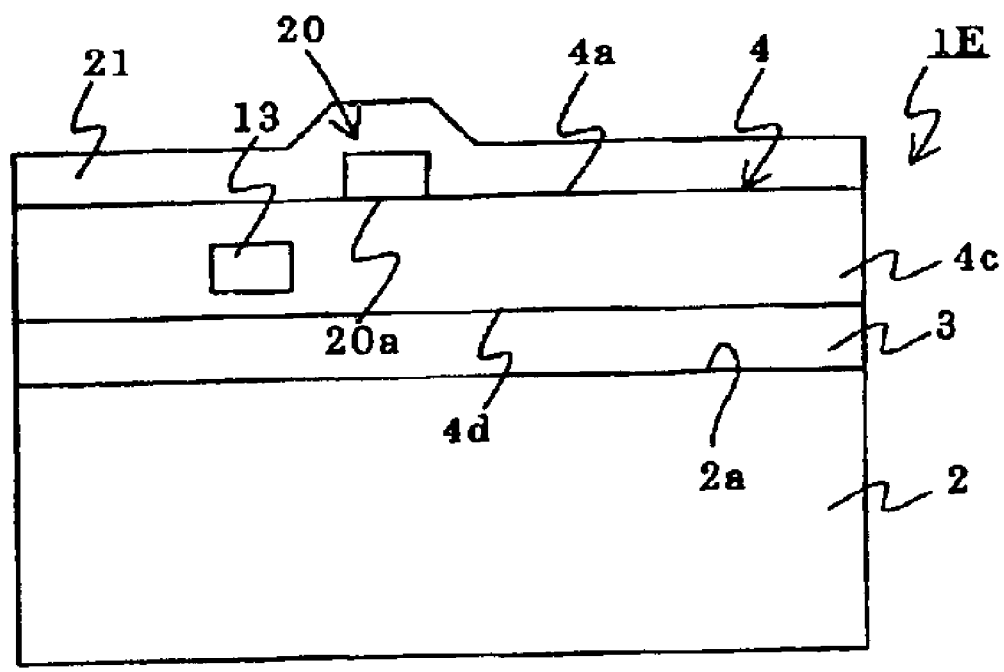
FIG. 10 is a front view showing an optical modulating device 1E at its end face.

FIGS. 8 to 10 relate to embodiments of modulating devices each having a ridge shaped three-dimensional optical waveguide. In a device 1C shown in FIG. 8, a three-dimensional optical waveguide 20 of ridge type is formed on the surface 4a of the slab optical waveguide 4. 20a represents an end face of the waveguide 20.

In a device 1D shown in FIG. 9, a three-dimensional optical waveguide 20 of ridge type is formed on the bottom face 4d of the slab optical waveguide. The bottom face 4d is joined with the supporting substrate 2 through the adhesive agent layer 3. The three-dimensional optical waveguide 20 of ridge type is thus embedded within the adhesive agent layer 3.

FIG. 10 shows a device 1E substantially same as the device 1C shown in FIG. 8. In the device 1E, however, an overcoat layer 21 is formed for covering the surface 4a of the slab optical waveguide 4 and the three-dimensional optical waveguide 20 of ridge type.

In the present invention, an optical modulating device may have a flat plate constituting a slab optical waveguide and a three-dimensional optical waveguide formed within the flat plate. Alternatively, an optical modulating device may have a flat plate constituting a slab optical waveguide and a three-dimensional optical waveguide of ridge type protruding from the flat plate.

Figure 11:
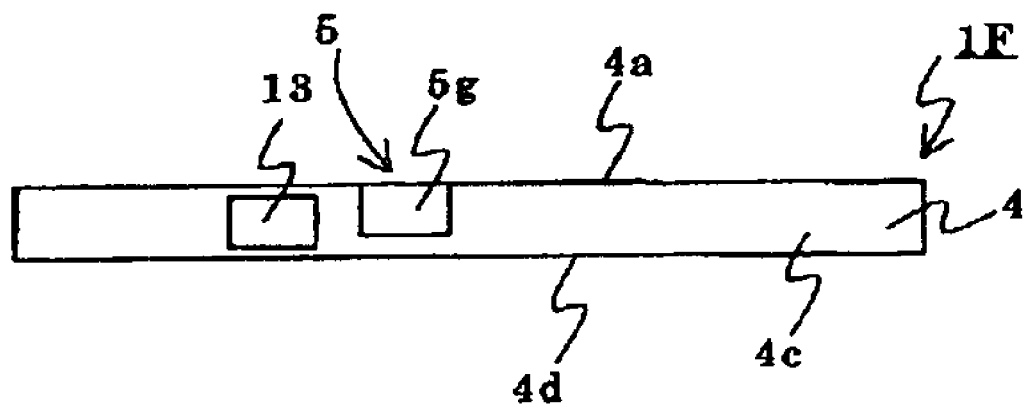
FIG. 11 is a front view showing an optical modulating device 1F at its end face.

For example, in a device 1F shown in FIG. 11, a flat plate 4 constitutes a slab optical waveguide and a three-dimensional optical waveguide 5 is formed in the flat plate 4. It is needed that such kind of plate-shaped device has a thickness sufficiently small for enabling slab mode propagation. Such plate-shaped device thus tends to induce a problem during its handling. It is thus preferred to fix the thin device 1F to another supporting member or supporting plate so that the thin device may be reinforced.

The present invention provides a novel optical modulator for modulating light by applying a voltage on light propagating in a three-dimensional optical waveguide so that the operational point may be controlled with improved efficiently and stability.

The present invention has been explained referring to the preferred embodiments. However, the present invention is not limited to the illustrated embodiments which are given by way of examples only, and may be carried out in various modes without departing from the scope of the invention.

What is claimed is:

1. An optical modulator for modulating light propagating in a three-dimensional optical waveguide by applying a voltage on said waveguide, said modulator comprising;

a three-dimensional optical waveguide having at least a pair of branched portions and a recombining portion of said branched portions and radiating light of off mode;

a slab optical waveguide guiding said light of off-mode, wherein said slab optical waveguide has a thickness of 20 μm or smaller;

a modulating electrode for applying a signal voltage and a direct current bias on said three-dimensional optical waveguide to modulate light propagating in said three-dimensional optical waveguide;

a photo detector for receiving light radiated from said slab optical waveguide and providing an output; and a controlling unit for varying said direct current bias based on said output from said photo detector so as to control the operational point of said modulator.

2. The optical modulator of claim 1, wherein said three-dimensional optical waveguide is a ridge-shaped optical waveguide protruding from said slab optical waveguide.

3. The optical modulator of claim 1, wherein said three-dimensional optical waveguide is formed by processing a material constituting said slab optical waveguide.

4. The optical modulator of claim 1, further comprising a supporting substrate and an adhesive layer joining said supporting substrate and said slab optical waveguide and having a refractive index lower than that of said slab optical waveguide.

5. The optical modulator of claim 4, wherein said adhesive layer is made of a glass or an adhesive agent.

6. The optical modulator of claim 1, wherein said photo detector is fitted on the end face of said slab optical waveguide.

7. The optical modulator of claim 1, further comprising an optical transmitter for receiving said light of off-mode radiated from said slab optical waveguide, wherein said photo detector receives light emitted from said transmitter.

8. A method for modulating light propagating in a three-dimensional optical waveguide by applying a voltage on said waveguide, said method comprising;

preparing an optical modulator comprising a three-dimensional optical waveguide including at least a pair of branched portions and a recombining portion of said branched portions, and a modulating electrode for applying a signal voltage and a direct current bias on said three-dimensional optical waveguide;

propagating light of off-mode radiated from said recombining portion in slab mode;

receiving said light of off-mode; and varying said direct current bias based on said received light so as to control the operational point of said optical modulator.

9. The method of claim 8, wherein said optical modulator comprises a slab optical waveguide and said light of off-mode propagates in said slab optical waveguide.

10. The method of claim 9, wherein said modulator comprises a photo detector for receiving said light of off-mode.

11. The method of claim 8, wherein said modulator comprises an optical transmitter for receiving said light of off-mode and a photo detector for receiving light radiated from said optical transmitter.

12. The method of claim 8, wherein said light of off-mode is propagated in multi mode.

13. The method of claim 8, wherein light is propagated in single mode in said three-dimensional optical waveguide.

* * * * *